United States Patent
Zhang

(10) Patent No.: US 7,770,702 B2
(45) Date of Patent: Aug. 10, 2010

(54) DURABLE OIL BUFFERS WITH AUTOMATIC RESET

(76) Inventor: Jianneng Zhang, No. 975 A1-1702 East Binjiang Road, Guangzhou (CN)

( * ) Notice: Subject to any disclaimer, the term of this patent is extended or adjusted under 35 U.S.C. 154(b) by 182 days.

(21) Appl. No.: 11/951,547

(22) Filed: Dec. 6, 2007

(65) Prior Publication Data
US 2008/0138192 A1   Jun. 12, 2008

(30) Foreign Application Priority Data
Dec. 7, 2006   (CN) .................. 2006 1 0124073

(51) Int. Cl.
*F16F 9/48* (2006.01)
(52) U.S. Cl. .................. 188/300; 267/120; 267/122
(58) Field of Classification Search ... 188/282.6–282.9, 188/300, 315; 267/64.12, 120, 122
See application file for complete search history.

(56) References Cited
U.S. PATENT DOCUMENTS

| 4,337,849 | A | * | 7/1982 | Siorek et al. | 188/276 |
|---|---|---|---|---|---|
| 4,616,812 | A | * | 10/1986 | Tornero | 267/131 |
| 4,863,147 | A | * | 9/1989 | Loeber et al. | 267/64.26 |
| 6,260,832 | B1 | * | 7/2001 | Vignocchi et al. | 267/64.15 |

\* cited by examiner

*Primary Examiner*—Christopher P Schwartz
(74) *Attorney, Agent, or Firm*—Global IP Services; Tianhua Gu

(57) ABSTRACT

This Invention publicizes a kind of oil buffers with automatic reset, aiming to provide a kind of buffers with simple structure, long service life and function of automatic compensation of oil leakage. Its technical kernel includes a cylinder and a case around the outer surface of the Cylinder, where elastic capsule for oil storage is provided between the cylinder and case and wraps outer surface of the cylinder, there are through holes to atmosphere on the case. This Invention can be applied in application of keeping speed constant, shock absorption and etc.

4 Claims, 1 Drawing Sheet

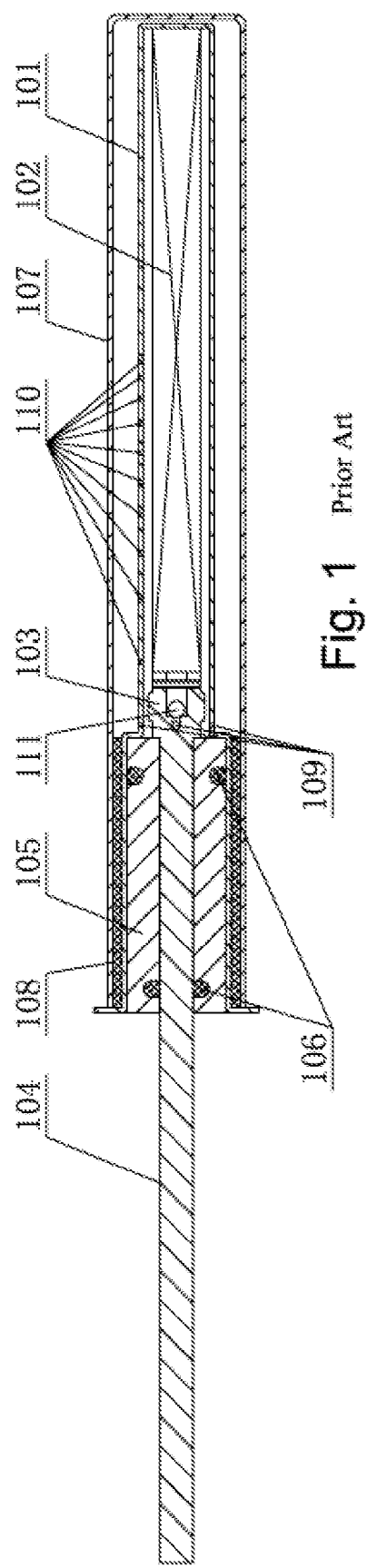
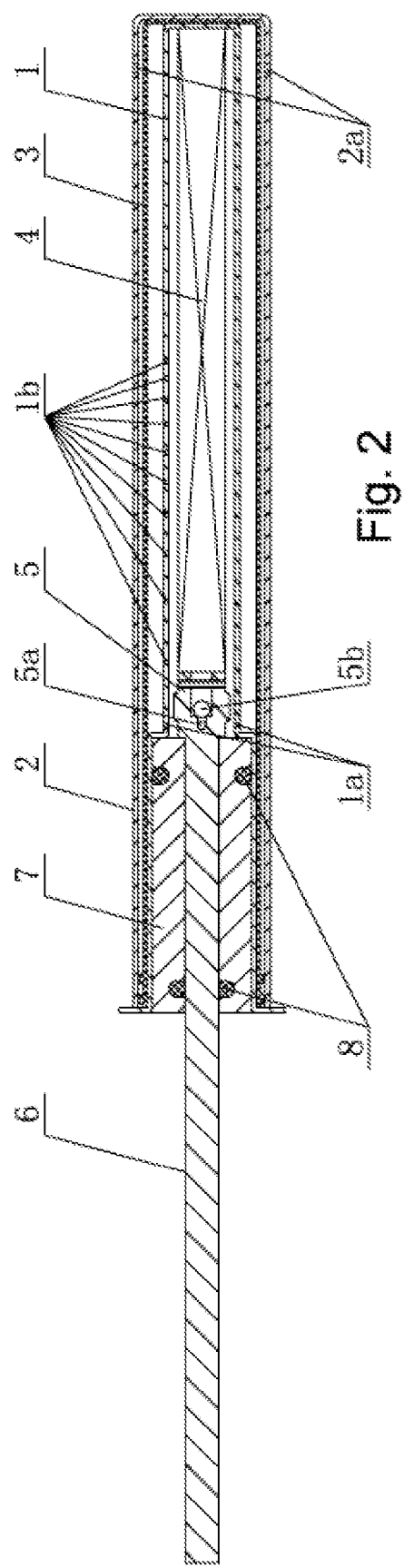

DURABLE OIL BUFFERS WITH AUTOMATIC RESET

CROSS REFERENCE TO RELATED PATENT APPLICATION

This invention claims the priority of the Chinese patent application No. 200610124073.7 with a filing date of Dec. 7, 2006.

FIELD OF THE INVENTION

This Invention relates to buffers for pressure, especially to a kind of durable oil buffers with automatic reset.

BACKGROUND OF THE INVENTION

The structure of conventional oil buffers for pressure with automatic reset is shown on the FIG. 1. It consists of a cylinder 101, a spring 102 and a piston 103 which is inside the cylinder 101. A piston rod 104 connects with the piston 103, a sleeve bearing 105 is mounted on the cylinder 101, seal rings 106 are between the piston rod 104 and sleeve bearing 105 and between the sleeve bearing 105 and cylinder 101. A case 107 is set on the cylinder 101, and a compressible bushing 108 is set between the cylinder 101 and the case 107. There are holes 109 for returning oil on the wall of the cylinder 101, a number of orifices 110 are arranged on the wall of the cylinder 101 along the axial direction. Holes 109 for returning oil and a check valve 111 are provided on the piston 103.

The operating principle is as follows: in case the piston rod 104 is pressed or impacted, the piston 103 compresses the spring 102 so that the spring 102 is compressed. The damping effect is realized by adjusting oil return speed from the right cavity to left cavity through the orifices 110 in the cylinder 101. The distances between two adjacent orifices are different. The speed will be changed gradually from high to low and to zero at the end. When an external force disappears, the piston 103 under the force from the string 102 pushes the piston rod 104 to move outwards. In this case, the check valve 111 on the piston 103 is opened, the oil in cylinder 101 may flow fast from the left cavity to the right cavity until the piston returns back to its original position.

There are following disadvantages for the conventional buffers: (1) it uses seal ring 106 between the piston rod 104 and sleeve bearing 105 to make sealing. When the piston rod 104 moving, the oil in cylinder 101 always sticks on the surface of the piston rod 104, after a period oil leakage will be happen. A vacuum will be finally appeared in the cylinder 101 because of this leakage after a period of operation. The oil leakage getting together causes the buffer finally be discarded as air is sucked into the cylinder 101. Thus, the service life of the buffer is short. (2) The space between the cylinder 101 and the case 107 are used to compensate the volume reduction of the cylinder 101 due to the piston rod entering into the cylinder 101. In order to ensure an effective travel of the piston rod 104, the diameter of the piston rod cannot be designed too large. Therefore, the rigidity of the piston rod 104 is low. It causes the buffer cannot endure a larger impact load.

SUMMARY OF THE INVENTION

The technical object of this Invention is a kind of durable oil buffers with automatic reset that is of simple structure and long service life, and is capable of automatic compensation of oil leakage.

Technical design of this invention is as follows:

A durable oil buffer with automatic reset comprises a cylinder with an open end and a closed end; a sleeve bearing is mounted on the open end of the cylinder, a spring is in the cylinder, a piston rod connected with a piston is located inside in the cylinder, the piston is against the spring and the piston rod passes through the sleeve bearing; a number of oil orifices are on the wall of the cylinder, an oil returning hole and a check valve are provided on the piston; an elastic capsule enwraps the outer surface of the cylinder to form a close elastic chamber, and oil fills in the chamber between the cylinder and elastic capsule; when the piston rod being pushed inside, the oil goes through the oil orifices into the elastic chamber and the spring is pressed, thereby buffer is achieved; when the push force being released the spring pushes the piston outward automatically, and the oil through the check valve and oil returning hole goes to the other end of the cylinder; If the oil leaking, the elastic capsule shrinks to compensate oil leakage, thereby vacuum in the cylinder is avoided, and the service life of the oil buffer is increased.

Furthermore, the elastic capsule can be put in a case, which is used for protecting the elastic capsule. A number of holes opened to atmosphere are provided on the case.

The above-mentioned creative structure including the elastic chamber for oil storage defined by the elastic capsule and the outer surface of the cylinder as well as the through holes to atmosphere on the case make automatic compensation for oil leakage and no vacuum be created in the cylinder for the buffer. The creative structure makes the service life of buffers longer; in addition, the expansion effect of the elastic capsule for oil storage makes it possible to balance the volumes of the right and left oil cavities automatically. As results, it is possible to increase the length of the piston rod, thereby to increase buffer's operating travel; to increase the diameter of the piston rod, thereby to increase the capacity of endurance of impact load and to expand the scope of application for the buffer.

BRIEF DESCRIPTION OF THE DRAWINGS

Following is a further detailed description of this Invention in conjunction with embodiment shown in drawings. But this description would not be construed as a limitation to this Invention.

FIG. 1 is a structural representation of a conventional buffer of oil pressure from prior arts.

FIG. 2 is a structural representation of a durable oil buffer with automatic reset of the present Invention.

DETAIL DESCRIPTION OF THE INVENTION

As shown in the FIG. 2, a durable oil buffer with automatic reset of this invention has a cylinder 1, a case 2 enwraps the outer surface of the cylinder 1, an elastic capsule 3 for storage of oil is set between the cylinder 1 and case 2, a spring 4 and a piston 5 are in the cylinder, a piston rod 6 is connected with the piston 5, a sleeve bearing 7 is mounted on the cylinder 1, and seal rings 8 are set between the piston rod 6 and the sleeve bearing and between the sleeve bearing 7 and cylinder 1. The elastic capsule for oil storage enwraps the outer surface of the cylinder 1 to define an elastic chamber for oil storage. There are two through holes 2a opened to atmosphere on the case 2. Holes for oil return 1a are on the wall of the cylinder 1 and a number of orifices 1b are on the wall of the cylinder 1 along the axial direction. The Holes for oil return 5a and the check valve 5b are provided on piston 5.

The operating principle for the durable oil buffer with automatic reset of the present invention is the same as that of prior art. The main difference is as follows: the creative structures including the elastic chamber for oil storage defined by the elastic capsule 3 and the outer surface of the cylinder 1 and through holes 2a opened to atmosphere on the case 2 make automatic compensation for oil leakage in the cylinder 1 and no vacuum will be created in the cylinder 1. Thus, the service life of buffers become longer significantly; in addition, the expansion effect of the elastic capsule 3 for oil storage makes it possible to balance the volumes of the right and left oil cavities automatically. As results, it is possible to increase the length of piston rod 6, to increase the buffer's operating travel, and to increase the diameter of the piston rod 6. Therefore, the buffer's capacity of endurance of impact load and apply scope are increased.

What is claimed is:

1. A durable oil buffer with automatic reset comprising:
   a cylinder with an open end and a closed end;
   a sleeve bearing mounted on the open end of the cylinder;
   a spring in the cylinder;
   a piston rod connected with a piston located inside in the cylinder, the piston being against the spring and the piston rod passing through the sleeve bearing;
   a plurality of oil orifices on the wall of the cylinder, an oil returning hole and a check valve provided on the piston;
   an elastic capsule enwrapping the cylinder, the elastic capsule together with an outer surface of the cylinder to define a closed elastic chamber, and oil being filled in the cylinder and the elastic chamber, the elastic capsule being bulged;
   when oil leaks, the bulged elastic capsule shrinks to compensate the oil leak, thereby no vacuum in the cylinder is created, and the service life of the oil buffer is increased.

2. The durable oil buffer of claim 1, wherein the elastic capsule is inside a case which is for protecting the elastic capsule, a number of holes opened to atmosphere are provided on the case.

3. The durable oil buffer of claim 1, wherein a seal ring is provided between the piston rod and the sleeve bearing, a seal ring is provide between the sleeve bearing and cylinder.

4. The durable oil buffer of claim 1, wherein the elastic capsule is made from oil-proof rubber or elastic plastic.

* * * * *